J. R. MITCHELL.
FRICTION SHOCK ABSORBING MECHANISM.
APPLICATION FILED APR. 3, 1919.
1,355,993. Patented Oct. 19, 1920.
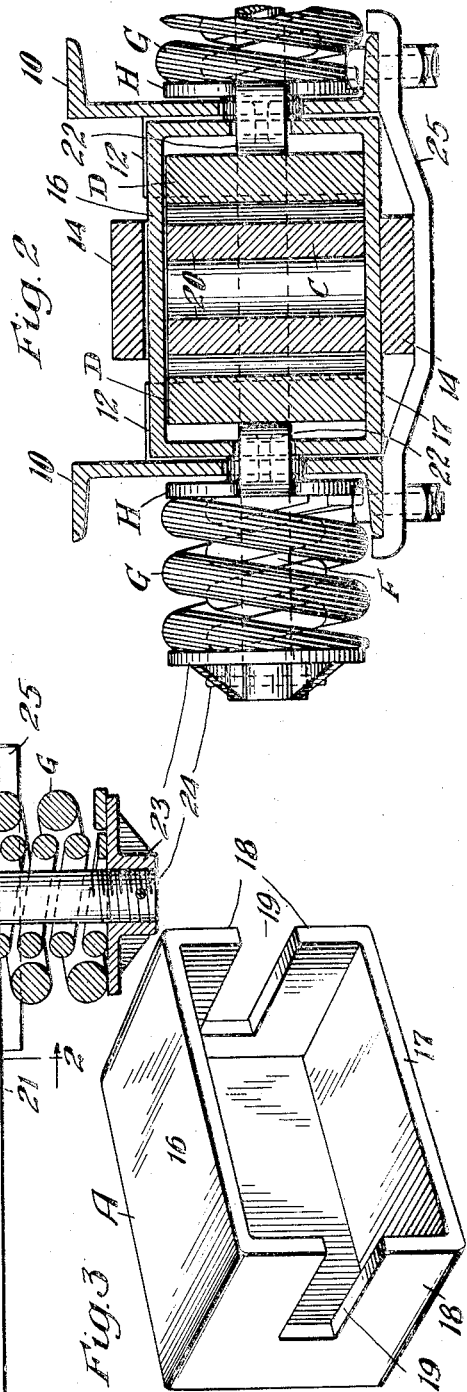
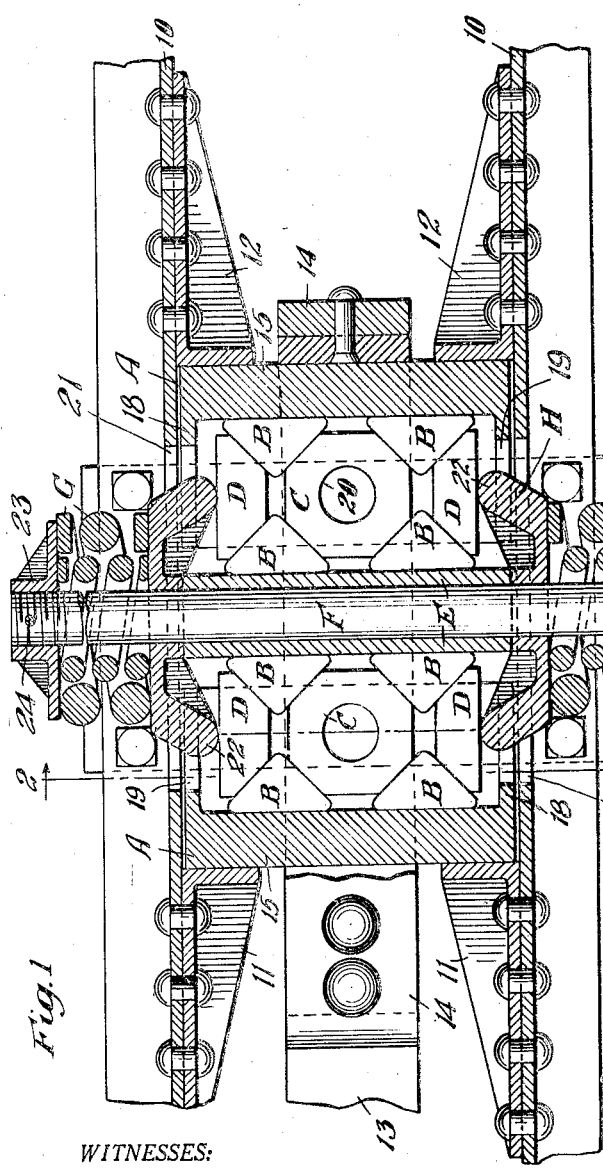
WITNESSES:
Wm. Geiger
INVENTOR.
John R. Mitchell
BY George I. Haight
his ATTORNEY

UNITED STATES PATENT OFFICE.

JOHN R. MITCHELL, OF EVANSTON, ILLINOIS, ASSIGNOR TO WILLIAM H. MINER, OF CHAZY, NEW YORK.

FRICTION SHOCK-ABSORBING MECHANISM.

1,355,993.  Specification of Letters Patent.  Patented Oct. 19, 1920.

Application filed April 3, 1919. Serial No. 287,228.

*To all whom it may concern:*

Be it known that I, JOHN R. MITCHELL, a citizen of the United States, residing at Evanston, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of my invention is to provide a friction shock absorbing mechanism more particularly adapted for railway draft riggings, and wherein the friction elements may be manufactured at relatively small expense in the form of ordinary castings, the parts being so arranged as to provide unusually high capacity and large friction wearing areas.

In the drawing forming a part of this specification, Figure 1 is a horizontal, sectional view of a portion of a railway draft rigging showing my improvements in connection therewith, parts being broken away near the top of the figure as viewed in the drawing to better accommodate the view on the sheet. Fig. 2 is a vertical, transverse, sectional view taken substantially on the line 2—2, parts of the spring and bolt at the right being broken away. And Fig. 3 is a detailed perspective of one of the followers.

In said drawing, 10—10 denote channel-shaped center or draft sills of a railway car to the inner faces of which are secured front stops 11—11 and rear stops 12—12 of any desired form. The draw bar 13 is operatively connected to the shock absorbing mechanism proper by any suitable means such as the usual yoke 14.

The shock absorbing mechanism, as shown, embodies, broadly, duplicate sets of friction devices interposed between two end followers, which sets of devices coöperate and simultaneously act to compress laterally extended springs mounted on a bolt extending transversely of the sills. The end followers are designated at A—A and each set of friction devices includes outer and inner friction wedge elements B—B, a central friction block C and side or laterally movable friction elements D—D. Between the pair of friction devices is interposed a central friction member E centrally perforated to accommodate a transversely extending bolt F on which are mounted the springs G—G at each end thereof and outside of the sills 10. In order that the duplicate sets of friction devices may simultaneously act on the springs G, I provide an equalizer H on each side, as clearly shown in Fig. 1.

Each follower A is in the form of a cage or hollow box, as shown most clearly in Fig. 3. Each of said followers comprises a main or back wall 15 forming the follower proper, upper wall 16, lower wall 17, side walls 18—18, the latter being notched or recessed as indicated at 19—19 to accommodate the equalizers H and permit movement of the followers A longitudinally toward and from each other.

The elements of each friction device are seated within the corresponding follower A as shown in Fig. 1, the same of course being supported and guided and retained in proper position between the walls of the follower. The friction elements B—B are preferably four in number, two bearing directly against the corresponding follower A, and the other opposed two elements B bearing against the central friction member E. The central friction element C is provided with four wedge faces at the corners thereof coöperable with the four friction elements B and each of the laterally movable or side friction elements D is provided at its ends with a pair of wedge faces coöperable with the corresponding outer wedge faces of the respective friction elements B—B. The central friction element C may be cored as indicated at 20 in order to facilitate casting.

The sills 10 are slotted as indicated at 21 to accommodate the equalizers H which have end inward extensions referenced 22 bearing on the corresponding pair of laterally movable friction elements D. The central friction element E, as heretofore mentioned, is centrally perforated to accommodate the bolt F and of course the equalizers H are centrally perforated to permit the latter to slide back and forth on the bolt. Each spring G is confined between an equalizer H at its inner end and an outer nut washer 23 applied on the end of the bolt F and held against accidental rotation by any suitable means such as the cotter 24. All of the parts are supported as by means of the detachable saddle plate 25 bolted to the lower flanges of the sills.

In operation, upon inward movement of the draw bar, it is evident that the rear follower A will remain stationary and the front follower will move toward the rear follower. As the front follower A moves inwardly, the front set of friction elements B—B will be forced inwardly. As said front elements B move inwardly they are in turn forced laterally due to the sliding action on the central element C of the front friction device. The latter, of course, will also slide rearwardly with respect to the inner set of friction elements B of the front friction device. This movement causes lateral separation during outward movement of the friction elements D—D of the front friction device thereby forcing the equalizers H outwardly or transversely to compress the springs G. Pressure from the front friction device will, of course, be transmitted through the central friction member E to the rear friction device and the elements of the latter will act simultaneously with and similarly to those of the front friction device so that the equalizers H will be forced outwardly or laterally by the rear friction device in unison with the lateral movement imparted to said equalizers by the front friction device. As will be understood by those skilled in the art, during the buffing movement as above described, all parts will move to a greater or less degree in lines parallel with the center line of the draft rigging with the exception of the two rearmost friction elements B—B and the rear follower A. Similarly under draft, all the parts will move forwardly to a greater or less extent in lines parallel to the center line of the draft rigging with the exception of the front follower A and the two outermost friction elements B—B.

With the construction disclosed, it is evident that all of the friction elements B, C, D and E as well as the followers A—A, may be readily manufactured as ordinary castings at minimum expense. Furthermore, it will be observed that I provide an unusually large amount of frictional wearing areas, there being no less than 24 sets of coöperating friction surfaces operating simultaneously and not including any friction which may be generated between the equalizers H and the laterally movable friction elements D—D. This, of course, increases the capacity of the mechanism per spring unit and promotes the life of the mechanism.

Although I have herein shown and described what I now consider the preferred manner of carrying out the invention, the same is merely illustrative and I contemplate all changes and modifications that come within the scope of the claims appended hereto.

I claim:

1. In a draft rigging for railway cars, the combination with draft sills having front and rear stop-acting means, the sills being slotted between said stop-acting means, of front and rear followers, a central friction member, a bolt extending transversely through said friction member and through the slots of the sills, a spring mounted on each end of the bolt, and equalizers also mounted on the bolt at opposite ends of said central friction member, and a set of friction elements interposed between each follower and said central friction member, each set including outer laterally movable friction elements coöperable with the equalizers.

2. In a friction shock absorbing mechanism, the combination with a pair of end followers relatively movable toward and from each other; of a central friction member interposed between said followers and having friction surfaces extending perpendicular to the said line of relative movement of the followers; of a set of friction elements interposed between each follower and said central friction element, each set including wedges having movement parallel to the said line of relative movement between the followers and friction shoes coöperable with the wedges arranged for movement transversely of said line of relative movement of the followers, both sets of said friction elements acting upon relative approach of the followers; and means for yieldingly resisting the said movement of the friction shoes.

3. In a friction shock absorbing mechanism, the combination with end followers relatively movable toward and from each other, said followers having friction surfaces on their inner sides extending transversely of the line of said relative movement; of a central floating friction member interposed between said followers and having friction surfaces on its opposite sides parallel with the friction surfaces of the followers; of two sets of friction elements, one set being interposed between each follower and central friction member, each set including end wedges frictionally coöperating with the respective follower and central friction member and friction shoes coöperating with said wedges, the friction shoes being adapted for movement transversely of the said line of relative movement of the followers; spring means compressible in a direction transversely of the said line of relative movement of the followers; and an equalizer, independent of said central friction member, extending from one set of friction elements to the other and coöperating with the spring means to compress the latter.

In witness that I claim the foregoing I have hereunto subscribed my name this 18th day of Mar., 1919.

JOHN R. MITCHELL.